(12) United States Patent
Huang et al.

(10) Patent No.: US 6,208,843 B1
(45) Date of Patent: Mar. 27, 2001

(54) RADIO FREQUENCY AND MICROWAVE MODULE FOR SIMULTANEOUSLY TRANSMITTING DATA AND AUDIO SIGNAL

(75) Inventors: Yu-Liang Huang, Tao Yuan; Te-Yi Chu; Der Fen Chu, both of Tao Yuan Hsien, all of (TW)

(73) Assignee: Cirocomm Technology Corp., Tao Yuan Hsien (TW)

( * ) Notice: Subject to any disclaimer, the term of this patent is extended or adjusted under 35 U.S.C. 154(b) by 0 days.

(21) Appl. No.: 09/324,849

(22) Filed: Jun. 3, 1999

(51) Int. Cl.[7] ................................................. H04B 1/40
(52) U.S. Cl. ................... 455/76; 455/76; 455/86; 348/6; 348/14
(58) Field of Search .................... 455/76, 78, 79, 455/86, 315, 316, 318, 339, 341, 260, 102, 103, 113, 118, 66, 67.5; 375/316, 324, 327, 376; 348/2, 3, 6, 14

(56) References Cited

U.S. PATENT DOCUMENTS

| | | | |
|---|---|---|---|
| 5,243,415 | * 9/1993 | Vance | 358/86 |
| 5,955,987 | * 9/1999 | Murphy et al. | 342/357.06 |
| 5,956,624 | * 9/1999 | Hunsinger et al. | 455/65 |
| 6,097,305 | * 8/2000 | Im et al. | 340/825.19 |
| 6,118,984 | * 9/2000 | Yu-Hong | 455/76 |

* cited by examiner

*Primary Examiner*—Edward F. Urban
*Assistant Examiner*—Congvan Tran
(74) *Attorney, Agent, or Firm*—Rosenberg, Klein & Lee

(57) ABSTRACT

A radio frequency and microwave module for simultaneously transmitting data and audio signal comprises a transmitting unit and a receiving unit. The transmitting unit has two pre-amplifier circuit two voltage-controlled oscillators (VCO), a phase-locked loop (PLL), two low pass filters (LPF), two amplifiers, a power combiner, a ceramic filter and a transmitting antenna. The receiving unit has a receiving antenna, a ceramic filter, a first low noise amplifier (LNA), a first mixer, an amplifier, a third VCO, a PLL, a low-pass filter, a channel filter, an IF amplifier, a phase shifter, a second mixer, a second low noise amplifier (LNA), a filtering circuit and an operational amplifier. The inventive module can be used for simultaneously transmitting data and audio signal, and the frequency response of the high frequency and low frequency component of the audio signal can be adjusted.

3 Claims, 2 Drawing Sheets

RADIO FREQUENCY AND MICROWAVE MODULE FOR SIMULTANEOUSLY TRANSMITTING DATA AND AUDIO SIGNAL

FIELD OF THE INVENTION

The present invention relates to a radio frequency (RF) and microwave module for simultaneously transmitting data and audio signal, which use both radio frequency and microwave module to simultaneously transmit data and audio signal.

BACKGROUND OF THE INVENTION

The conventional microwave video transmitting device generally uses frequency modulation (FM) to transmit data and audio signal. However, no device using both RF and microwave module to simultaneously transmit data and audio signal has been developed yet.

The present invention is intended to provide a radio frequency (RF) and microwave module for simultaneously transmitting data and audio signal, and the frequency response of the high frequency and low frequency component of the audio signal can be adjusted.

It is an object of the present invention to provide a device by which the keyboard, mouse, joystick, printer ,alarming system, audio set, loud speak, ear phone, bar-code reader can be used in wireless fashion and in RF and microwave regime.

The various objects and advantages of the present invention will be more readily understood from the following detailed description when read in conjunction with the appended drawing, in which:

DETAIL DESCRIPTION OF PREFERRED EMBODIMENT

Figure 1:
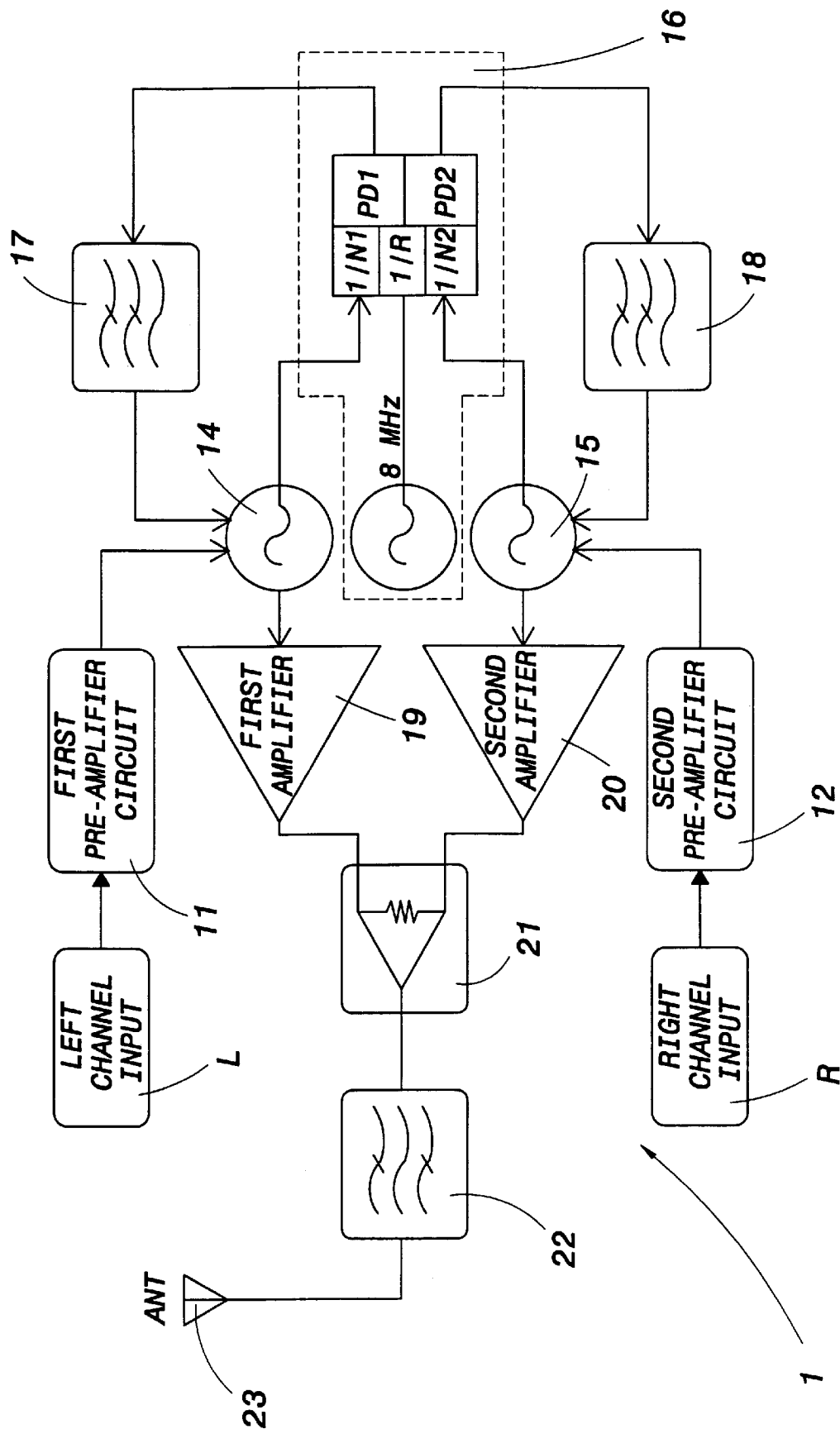
FIG. 1 is the block diagram of the transmitting unit in the present invention.
Figure 2:
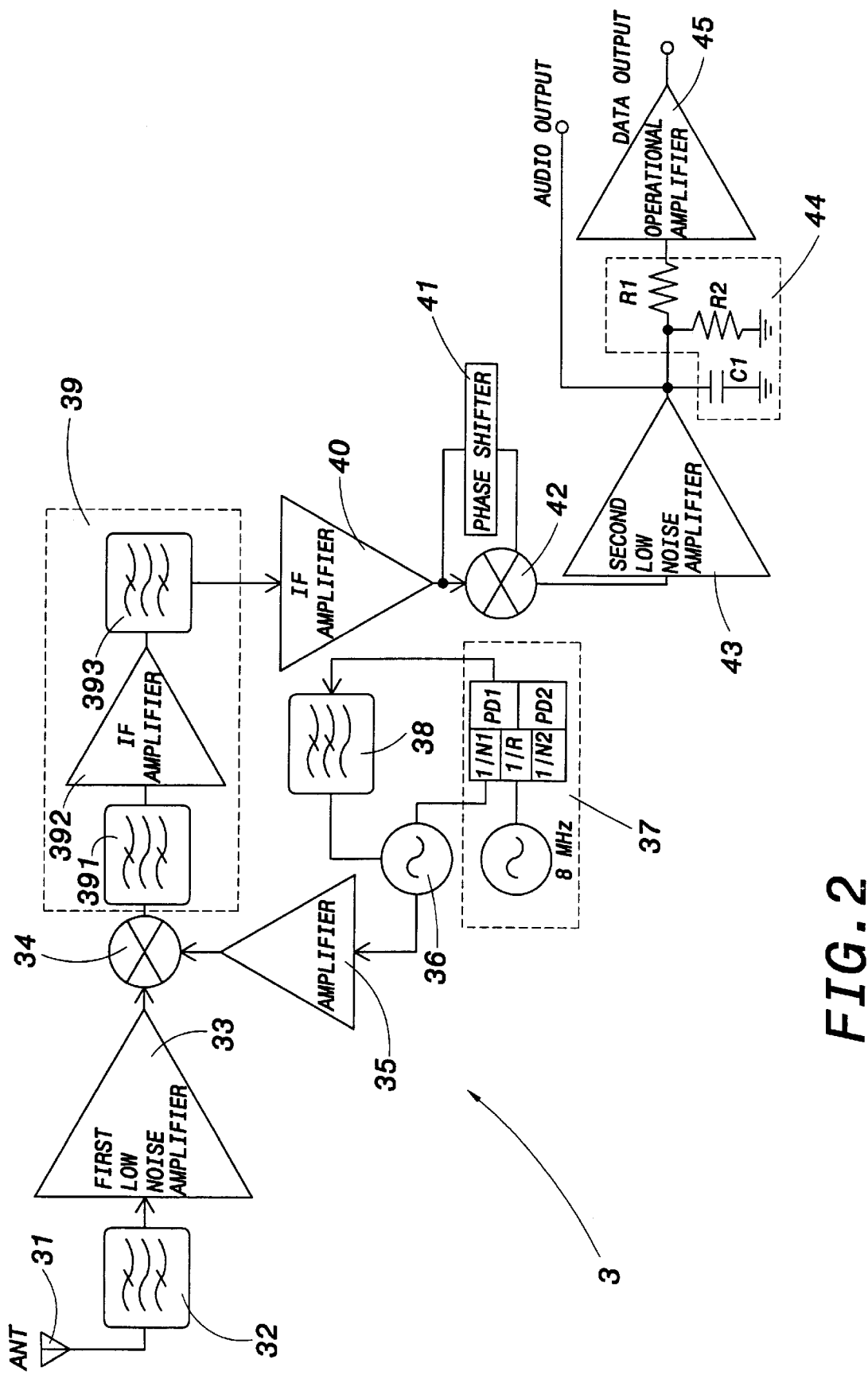
FIG. 2 is the block diagram of the receiving unit in the present invention.

With reference now to FIGS. 1 and 2, the inventive device for simultaneously transmitting data and audio signal in RF and microwave regime comprises a transmitting unit 1 and a receiving unit 2.

The transmitting unit 1 comprises two pre-amplifier circuit 11 and 12, two voltage-controlled oscillators (VCO) 14 and 15, a phase-locked loop (PLL) 16, two low pass filters (LPF) 17 and 18, two amplifiers 19 and 20, a power combiner 21, a ceramic filter 22 and a transmitting antenna 23.

The input of the first pre-amplifier circuit 11 is connected to a left channel input L in order to pre-amplify the data and audio signal input from the left channel input L.

The input of the second pre-amplifier circuit 12 is connected to a right channel input R in order to pre-amplify the data and audio signal input from the right channel input R.

The first VCO 14 is connected to the output of the first pre-amplifier circuit 11 and the PLL 16 comprising reference oscillator, frequency divisor and phase comparator, wherein the PLL 16 divides the oscillation frequency output from the first VCO 14 and compares the result with the output frequency of the reference oscillator, thus obtaining a stable output frequency. One output of the PLL 16 is connected to the first low pass filter 17, the output thereof is connected to the first VCO 14. The output of the first VCO 14 is connected to the first amplifier 19.

The first VCO 14 is functioned to modulate the signal input from the first pre-amplifier circuit 11 and send the modulated signal to the PLL 16, wherein the modulated signal is processed for frequency division and phase comparison with reference to the reference oscillator therein. Afterward, the resulting signal is transmitted through a low-pass filter 17 to the first VCO 14 for changing the oscillation frequency thereof and then amplified by the first amplifier 19.

The second VCO 15 is connected to the output of the second pre-amplifier circuit 12 and the PLL 16 comprising reference oscillator, frequency divisor and phase comparator, wherein the PLL 16 divides the oscillation frequency output from the second VCO 15 and compares the result with the output frequency of the reference oscillator, thus obtaining a stable output frequency. One output of the PLL 16 is connected to the second low pass filter 18, the output thereof is connected to the second VCO 15. The output of the second VCO 15 is connected to the second amplifier 20.

The second VCO 15 is functioned to modulate the signal input from the second pre-amplifier circuit 12 and send the modulated signal to the PLL 16, wherein the modulated signal is processed for frequency division and phase comparison with reference to the reference oscillator therein. Afterward, the resulting signal is transmitted through a second low-pass filter 18 to the second VCO 15 for changing the oscillation frequency thereof and then amplified by the second amplifier 20.

The power combiner 21 is connected to the output of the first amplifier 19 and the second amplifier 20, and the output thereof is connected to the ceramic filter 22, wherein the output of the ceramic filter 22 is transmitted through the transmitting antenna 23.

The receiving unit 3 comprises a receiving antenna 31, a ceramic filter 32, a first low noise amplifier (LNA) 33, a first mixer 34, an amplifier 35, a third VCO 36, a PLL 37, a low-pass filter 38, a channel filter 39, an IF amplifier 40, a phase shifter 341, a second mixer 42, a second low noise amplifier (LNA) 43, a filtering circuit 44 and an operational amplifier 45.

The input of the ceramic filter 32 is connected to the receiving antenna 31 and the output thereof is connected to the first low noise amplifier (LNA) 33. The ceramic filter 32 is functioned to filter the signal input from the receiving antenna 31 and send the filtered signal to the first low noise amplifier (LNA) 33 for amplifying.

The input of the first mixer 34 is connected to the output of the first low noise amplifier (LNA) 33 and the first mixer 34 is connected to the amplifier 35. The input of the amplifier is connected to the third VCO 36, the output thereof is connected to a PLL 37 comprising reference oscillator, frequency divisor and phase comparator. The input of the PLL 37 is connected to the low-pass filter 38, the output thereof is connected to the third VCO 36.

The PLL 37 is functioned to divide the frequency of the oscillator signal from the third VCO 36 and compare the phase of the divided signal with the signal generated by the reference oscillator to obtain a stable frequency. Afterward, the resulting signal is sent, through the low-pass filter 38, to the third VCO 36, to change the oscillation frequency thereof, and then amplified by the amplifier 35.

The first mixer 34 is functioned to mix the output signal of the first low noise amplifier (LNA) 33 and the output signal of the amplifier 35, and then send the mixed signal to the channel filter 39.

The input of the channel filter 39 is connected to the output of the first mixer 34 and has a first dielectric filter 391, an IF amplifier 392 and a second dielectric filter 393, wherein the output of the first dielectric filter 391 is connected to the IF amplifier 392, the output of the IF amplifier 392 is connected to the second dielectric filter 393, the output of the second dielectric filter 393 is connected to the IF amplifier 40.

The channel filter 39 is used to down-convert the output signal of the first mixer 34 to obtain a 10.7 MHz IF signal and determines the frequency response of data accessing amount of the audio signal and the IF signal is amplifier by the IF amplifier 40.

The input of the second mixer 42 is connected to the output of the IF amplifier 40 and the phase shifter 41 is arranged between the second mixer 42 and the IF amplifier 40. The output of the second mixer 42 is connected to the second low noise amplifier (LNA) 43.

The second mixer 42 is used to demodulate the signal output by the IF amplifier 40 and 90 degree phase shifted by the phase shifter 41 to obtain the data, audio or data and audio signal and send the audio signal to the second low noise amplifier (LNA) 43 for amplification.

The filtering circuit 44 comprises a capacitor C1, resistors R1 and R2, wherein the capacitor C1 determines the data speed. The input of the filtering circuit 44 is connected to the second low noise amplifier (LNA) 43 and the output thereof is connected to the operational amplifier 45.

The filtering circuit 44 is used to filter the output signal of the second low noise amplifier (LNA) 43 and send the filtered signal to the amplifier 45 for voltage comparison to obtain the output data.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A radio frequency and microwave module for simultaneously transmitting data and audio signal, comprising a transmitting unit and a receiving unit, wherein said transmitting unit having a first pre-amplifier circuit to pre-amplify the data and audio signal input from a left channel input;

a second pre-amplifier circuit to pre-amplify the data and audio signal input from a right channel input;

a first voltage controlled oscillator VCO connected to the first pre-amplifier circuit and a phase locked loop (PLL), one output of the PLL connected to a first low pass filter, the output of the first low pass filter connected to the first VCO; the first VCO functioned to modulate the signal input from the first pre-amplifier circuit and send the modulated signal to the PLL, wherein the modulated signal is processed for frequency division and phase comparison with reference to a reference oscillator of the PLL to obtain a stable frequency; afterward, the resulting signal is transmitted through the low-pass filter to the first VCO for changing the oscillation frequency thereof;

a first amplifier connected to the output of the first VCO to amplifier the output signal thereof;

a second voltage controlled oscillator VCO connected to the second pre-amplifier circuit and a phase locked loop (PLL), one output of the PLL connected to a second low pass filter, the output of the second low pass filter connected to the second VCO; the second VCO functioned to modulate the signal input from the second pre-amplifier circuit and send the modulated signal to the PLL, wherein the modulated signal is processed for frequency division and phase comparison with reference to a reference oscillator of the PLL to obtain a stable frequency; afterward, the resulting signal is transmitted through the low-pass filter to the second VCO for changing the oscillation frequency thereof;

a second amplifier connected to the output of the second VCO to amplifier the output signal thereof;

a power combiner connected to the output of the first amplifier and the second amplifier, and the output thereof connected to a ceramic filter, wherein the output of the ceramic filter is transmitted through a transmitting antenna;

the receiving unit comprising a ceramic filter, the input thereof connected to the receiving antenna and the output thereof connected to a first low noise amplifier (LNA); the ceramic filter functioned to filter the signal input from the receiving antenna and send the filtered signal to the first low noise amplifier (LNA) for amplifying;

a third VCO, the input thereof connected to a PLL, the output of the PLL connected to a low pass filter, the output of the low pass filter connected to the third VCO, the PLL functioned to divide the output frequency of the third VCO and phase comparison with reference to a reference oscillator of the PLL to obtain a stable frequency; afterward, the resulting signal is transmitted through the low-pass filter to the third VCO for changing the oscillation frequency thereof;

a first mixer, the input thereof connected to the output of the first low noise amplifier (LNA) and the first mixer connected to an amplifier, the input of the amplifier connected to the third VCO, the first functioned to mix the output of the first low noise amplifier (LNA) and the output of the amplifier and output the mixed signal;

a channel filter, the input thereof connected to the output of the first mixer, the output thereof connected to an IF amplifier, the channel filter functioned to down-convert the frequency the output signal of the first mixer to obtain an IF signal and determine the frequency response and data accessing amount of an audio signal, and the IF signal amplifier by the IF amplifier;

a second mixer, the input thereof connected to the output of the IF amplifier and a phase shifter arranged between the second mixer and the IF amplifier; the second mixer used to demodulate the signal output by the IF amplifier and 90 degree phase shifted by the phase shifter 41 obtain the data, audio or data and audio signal;

a second low noise amplifier (LNA) connected to the output of the second mixer, the second low noise amplifier (LNA) functioned to amplifier the audio signal output by the second mixer to obtain audio output;

a filtering circuit connected to the second low noise amplifier (LNA) and the output thereof connected to an operational amplifier; the filtering circuit used to filter the output signal of the second low noise amplifier (LNA) and send the filtered signal to the amplifier for voltage comparison to obtain output data.

2. The radio frequency and microwave module as in claim 1, wherein the channel filter has a first dielectric filter, an IF amplifier and a second dielectric filter.

3. The radio frequency and microwave module as in claim 1, wherein the frequency of the IF signal obtain from the channel filter is 10.7 MHz.

* * * * *